Sept. 23, 1958    D. J. COFFEY    2,852,858
LEVEL SUPPORTING DEVICE
Filed Sept. 24, 1953    2 Sheets-Sheet 1
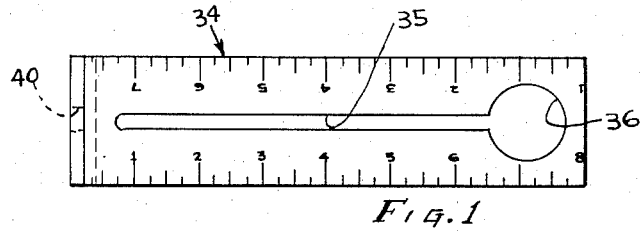
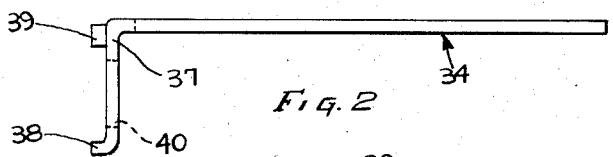
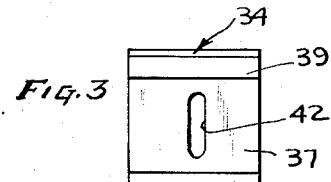
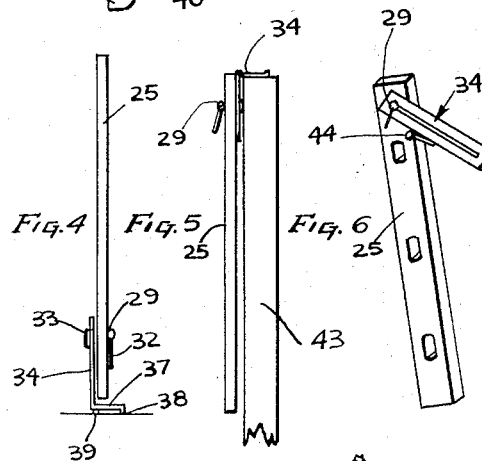
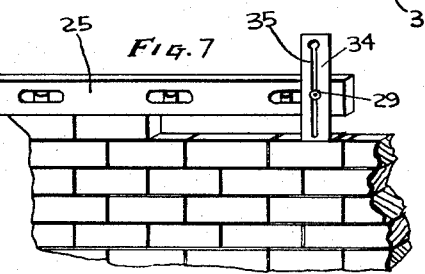
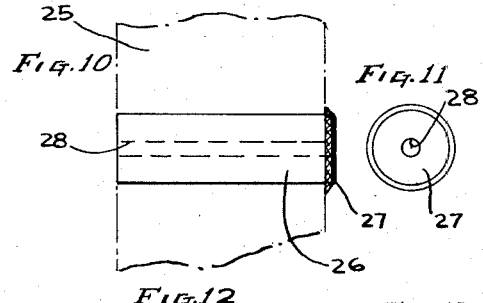
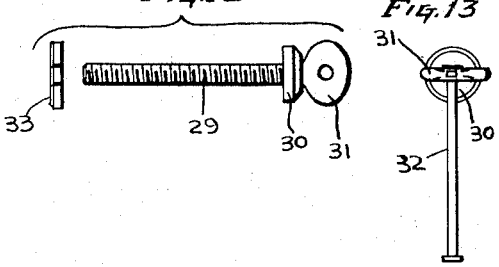
INVENTOR.
DANIEL J. COFFEY
BY
L. S. Saulsbury
ATTORNEY Sept. 23, 1958      D. J. COFFEY      2,852,858
LEVEL SUPPORTING DEVICE
Filed Sept. 24, 1953      2 Sheets-Sheet 2
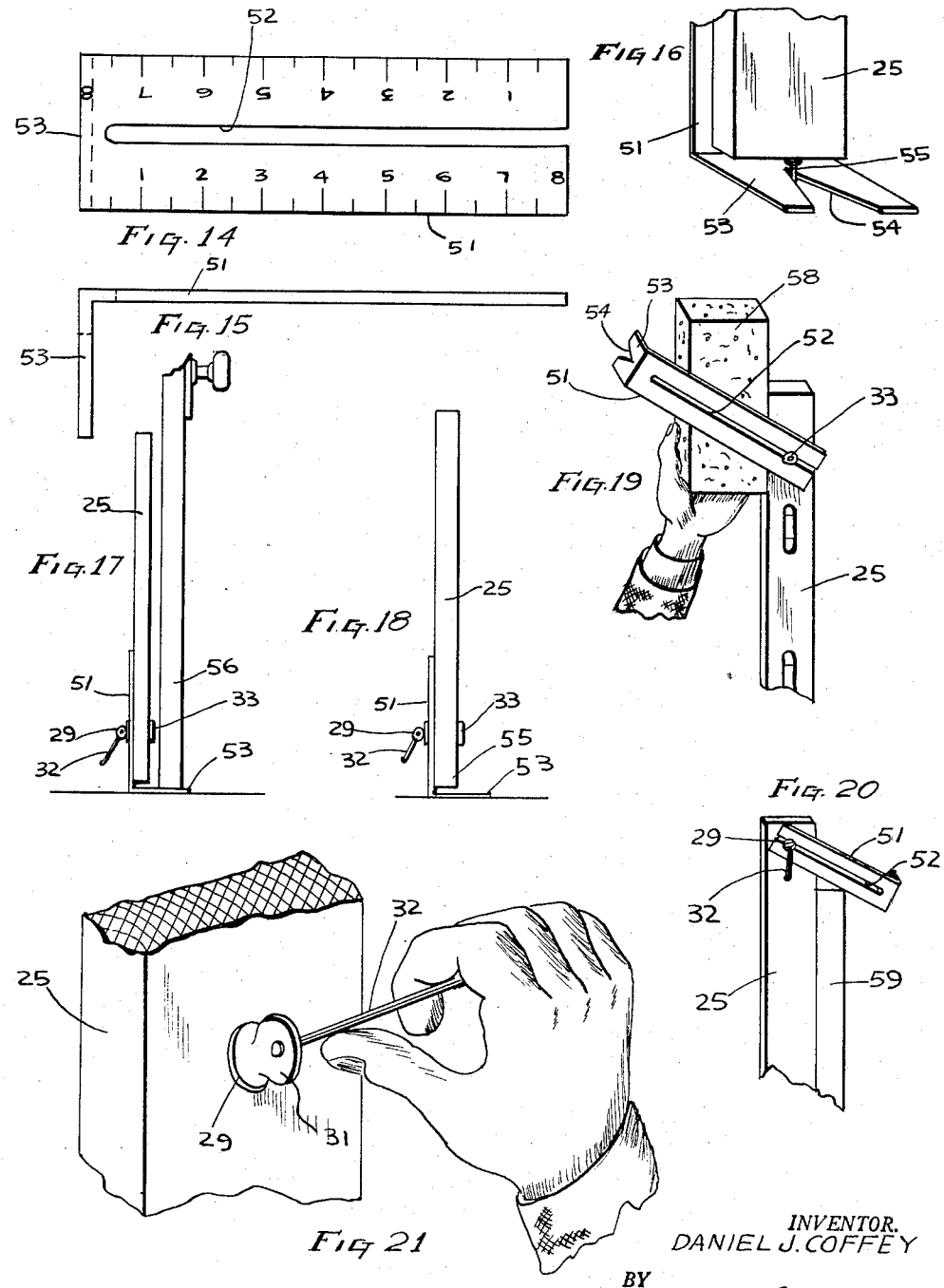
INVENTOR.
DANIEL J. COFFEY
BY
L. S. Saulsbury
ATTORNEY United States Patent Office 2,852,858
Patented Sept. 23, 1958

2,852,858

LEVEL SUPPORTING DEVICE

Daniel J. Coffey, Bronx, N. Y.

Application September 24, 1953, Serial No. 382,054

1 Claim. (Cl. 33—207)

This invention relates to a level supporting device.

It is an object of the present invention to provide a device which can be attached to a mason's level so that the level when not in use can be easily supported in positions upon the wall surface being constructed or upon a floor or in other locations without concern being given to the same being knocked over and also where it will be convenient to easily grasp the level when it is desired for use.

It is another object of the invention to provide a supporting bracket for the level gauge which can be easily attached to the level and also which may serve as a guide for the marking or cutting of a brick or the like and which will have numerical measuring indications thereon to give to the brick worker the desired dimension and wherein the device can be used as a square to provide a marking edge.

It is another object of the invention to provide an adjustable gauge to be used in connection with a mason's level and which is adjustable to different lengths in order to measure the height of the brick course and thereby predetermine the size of the bed joint of mortar to be placed on succeeding courses or layers of brick.

Other objects of the invention are to provide a level supporting device or attachment on the level which is of simple construction, inexpensive to manufacture, has a minimum number of parts, durable, easy to fix to the level, gives protection to the level, serves to display the level, makes the level easy to store for shipping and transport, efficient and effective in use.

For a better understanding of the invention, reference may be had to the following detailed description taken in connection with the accompanying drawing, in which:

Figure 1 is an elevational view of a rear face of the supporting device constructed according to one form of the invention;

Fig. 2 is a side edge elevational view;

Fig. 3 is a bottom plan view;

Fig. 4 is an elevational view of a level with the supporting device attached thereto and serving to support the level in an endwise manner upon a floor surface;

Fig. 5 is an elevational view of the level and of the supporting device connected thereto and fitted over a top edge to suspend the level therefrom;

Fig. 6 is a side elevational view of the level with the supporting device angled to permit the use of the device to mark a brick at an angle;

Fig. 7 is a side elevational view of a level gauge with the supporting device angled ninety degrees with respect to the level gauge to serve as a support upon a brick wall course and its bottom extended a measured distance from the side edge of the level and substantially the height of the brick plus the mortar joint thereby automatically producing equal and uniform bed joints;

Fig. 8 is an illustrative view showing the supporting device removed from the level and placed on a brick to mark the same for a desired cut or piece;

Fig. 9 is a fragmentary view of the level gauge and of the supporting device connected thereto and with the supporting device secured to a screw eye in a base so that the level gauge can be supported upon its end but with the foot being slightly modified to provide side notches;

Fig. 10 is a side elevational view of the attaching member by which the supporting bracket is fixed to the side of the level; this attaching member being extendible through a hole in the level;

Fig. 11 is an end view of the attaching member, as shown in Fig. 10;

Fig. 12 is a side elevational view of the bolt and nut which is extendible through the member shown in Fig. 10;

Fig. 13 is an end elevational view of the bolt and of the handle for turning the same;

Fig. 14 is a front face elevational view of a modified form of the invention;

Fig. 15 is a side elevational view of the form of the invention shown in Fig. 14;

Fig. 16 is a fragmentary perspective view of the supporting device shown in Fig. 14 and looking upon the notched bottom part, the same extended under a nail head;

Fig. 17 is a side elevational view showing the supporting device attached to the level and the level fitted under a door to keep the same in an upright position;

Fig. 18 is a view similar to Fig. 17 where the level gauge is supported on the bottom of the supporting device;

Fig. 19 is a perspective view showing the supporting bracket for the level gauge used as a guide for the marking or cutting of a brick;

Fig. 20 is a perspective view of the level gauge with the bracket angled in such a manner as to provide an angle projection for the extension of the level gauge over a top edge in order that it can be suspended therefrom;

Fig. 21 is a perspective view showing the manner in which the bolt is tightened upon the level gauge for the purpose of securing the supporting device thereto.

Referring now particularly to Figs. 1 to 9, 25 represents a level gauge. This level gauge has a hole adjacent the ends of the same which is normally used for placing the gauge over a nail or upon a hook. According to the present invention, the hole in the level gauge 25 is filled with a sleeve member 26 having an enlarged head 27 thereon and is shown in Figs. 10 and 11. This sleeve has a small hole or aperture 28 extending therethrough and through which there is extended a bolt 29 having head 30 and an eye portion 31 through which a slide handle 32 extends for the purpose of tightening the bolt within the sleeve 26. A nut 33 is placed on the threaded end of the bolt 29 and engages with the supporting device member 34.

This supporting device member 34 is elongated and has a slot 35 extending therethrough. This slot has an enlargement 36 for receiving the nut 33 so that the nut does not have to be disengaged each time that the member 34 is attached thereto. The member 34 has a foot portion 37 extending at an angle from the end of the same and has a downwardly bent edge 38 and a support 39 at the heel of the portion 37. This portion 37 also has an elongated slot 40 for receiving an eye 41 in a board 42 that can be placed on a floor surface. With the foot portion 37 placed on the floor surface or upon the board 42, it is so connected and so shaped and of such size that it will support a level gauge in an upright manner, as illustrated in Figs. 4 and 9. To give more effective support, the eye 41 is used. With eye in slot, the member is then turned to lie transversely of eye loop on head.

As shown in Fig. 5, it will be seen that the member 34 can be used to suspend the level 25 from the upper edge of a door or wall 43. The foot portion 37 will overlie the upper edge of the door.

In Fig. 6, it will be seen that the member 34 can be connected rigidly at an angle to the level gauge 25 so that the member 34 can serve as a hook for the securement of the level gauge over a nail 44 on a wall surface. This provides another manner in which the supporting device can be secured upon the level gauge to support the level gauge in a suspended manner.

As shown in Fig. 7, the supporting device can be angled to a greater extent to extend at right angles to the edge of the level gauge so as to provide the support for the level gauge upon a brick course and to support the level gauge when the level gauge is put in use upon a brick wall.

As shown in Fig. 8, the level member can be removed from the level gauge by simply sliding the member along the bolt 29 and removing it over the nut 33 and placing the member 34 upon the brick as illustrated in Fig. 8. The face of the member has scales to measure off distance. The foot portion 37 will engage with the side of the brick. In other words, the member 34 is used as a square or measuring scale.

In Fig. 9, it will be seen that the foot portion 37 may have side notches 37' and 37" to receive a nail or screw eye.

In Fig. 1, the manner of tightening the bolt 29 with the slide handle arm 32 is illustrated. The head portion 30 is brought flush against the flange 27 of the sleeve 26.

Referring now particularly to Figs. 14 to 20, there is shown a modified form of the invention. The supporting member is generally indicated at 51 and has a slot 52 extending substantially throughout the full length of the same and open on the free end. A bottom is bent upwardly as indicated at 53 and is provided with a notch 54 in order that the supporting member 51 can be attached under a nail or screw eye tack 55 and the level gauge 25 held in an upright manner. The supporting bracket member 51 is secured to the level gauge by the bolt 29 that extends into the slot 52 and on which nut 33 is secured to fix the supporting member 51 against the side of the gauge 25.

As shown in Fig. 17, the angled portion 53 can be extended underneath the door 56 and the level gauge held in an upright manner. Also, the level gauge can be held, as shown in Figs. 16 and 18, by sliding the portion 53 under the nail 55.

The member 51 has on its back face two scales, as shown in Fig. 14. By loosening the bolt 29, the member 51 can be adjusted to a position extending at an angle from the side of the level gauge 25, as shown in Figs. 19 and 20. When the member 51 is angled, as shown in Fig. 19, the brick 58 can be placed against the edge of the level and the side edge of the member 51 used as a guide for a pencil to make a mark thereacross. Thereafter, the brick can be cut in two along the line so made. With the member 51 angled as shown in Fig. 20, a hook is provided by which the gauge can be rested over the top of the door or wall 59.

It should now be apparent that there has been provided a supporting device for a level gauge which can be attached to the level gauge by the mere fixing of an attachment within the hole opening ordinarily provided therein near the end of the gauge and wherein the device can be adjusted to different positions and arranged to be connected to supports, either so that the level gauge can be suspended from a high support or can be located under a low support.

While various changes may be made in the detail construction, it shall be understood that such changes shall be within the spirit and scope of the present invention, as defined by the appended claim.

What is claimed is:

In combination a level gauge having a sleeve member extending through an opening adjacent to one end of the gauge, said sleeve member having an enlarged head and an opening extending through said sleeve and said head, a bolt threaded at one end and provided with handle means at the other end and extending through the sleeve opening, a threaded nut adapted to engage with the threaded end of said bolt, a flat elongated member provided with a slot adapted to receive said bolt and having an enlarged opening connected with the slot and adapted to receive said nut, said flat elongated member having straight side edges and scales for measuring distance, and a flat foot member provided with a slot and extending at an angle from the end of the flat elongated member.

References Cited in the file of this patent

UNITED STATES PATENTS

| | | |
|---|---|---|
| 366,404 | Klif | July 12, 1887 |
| 494,944 | Tostevin | Apr. 4, 1893 |
| 1,322,831 | Seiss | Nov. 25, 1919 |
| 1,502,385 | Howenstein | July 22, 1924 |
| 1,647,794 | Gibson | Nov. 1, 1927 |
| 1,683,394 | Newmyer | Sept. 4, 1928 |
| 2,316,389 | Atkinson | Apr. 13, 1943 |
| 2,550,699 | Lamb | May 1, 1951 |

FOREIGN PATENTS

| | | |
|---|---|---|
| 118,314 | Sweden | Mar. 11, 1947 |